United States Patent
Zeng et al.

(10) Patent No.: US 7,366,414 B2
(45) Date of Patent: Apr. 29, 2008

(54) METHOD AND APPARATUS UTILIZING TUNABLE DIFFERENTIAL GROUP DELAY

(75) Inventors: Ke-Cai Zeng, Hayward, CA (US); Raymond L. Chong, San Jose, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 703 days.

(21) Appl. No.: 10/423,148

(22) Filed: Apr. 24, 2003

(65) Prior Publication Data

US 2004/0213500 A1    Oct. 28, 2004

(51) Int. Cl.
*H04J 14/00* (2006.01)
(52) U.S. Cl. ............ 398/53; 398/65; 398/102
(58) Field of Classification Search ............ 398/29, 398/53, 65, 98, 102, 119, 147
See application file for complete search history.

(56) References Cited

U.S. PATENT DOCUMENTS

| | | | |
|---|---|---|---|
| 5,930,414 A * | 7/1999 | Fishman et al. ............ 385/11 |
| 6,104,515 A * | 8/2000 | Cao ............................ 398/147 |
| 6,411,750 B1 * | 6/2002 | Fishman et al. ............ 385/11 |
| 6,798,791 B1 * | 9/2004 | Riazi et al. ................. 370/515 |
| 6,842,283 B2 * | 1/2005 | Savory et al. .............. 359/499 |

OTHER PUBLICATIONS

H. Rosenfeldt, C. Knothe, R. Ulrich, E. Brinkmeyer, U. Feiste, C. Schubert, J. Berger, R. Ludwig, H.G. Weber, and A. Ehrhardt, "Automatic PMD Compensation at 40 Gbit/s and 80 Gbit/s Using a 3-Dimensional DOP Evaluation for Feedback", OFC 2001, paper PD27, 2001.
Q. Yu, L.-S. Yan, Y. Xie, M. Hauer, and A. E. Willner, "Higher Order Polarization Mode Dispersion Compensation Using a Fixed Time Delay Followed by a Variable Delay", IEEE Photon. Technol. Lett, 8, 863-865, (2001).
M. Shtaif, A. Mecozzi, M.Tur, and J.A. Nagel, "A Compensator for the Effects of High-Order Polarization Mode Dispersion in Optical Fibers", IEEE Photon. Technol Lett, 12, 434-436, (2000).

* cited by examiner

*Primary Examiner*—Dzung Tran
(74) *Attorney, Agent, or Firm*—Mikio Ishimaru (57) ABSTRACT

A method and apparatus for utilizing tunable differential group delay with at least a component of a fiber optic transmission system includes providing a tunable differential group delay system that is optically connected to a component of the fiber optic transmission system. The tunable differential group delay system is then controlled to insert differential group delay into the component of the fiber optic transmission system.

12 Claims, 3 Drawing Sheets

METHOD AND APPARATUS UTILIZING TUNABLE DIFFERENTIAL GROUP DELAY

TECHNICAL FIELD

The present invention relates generally to the field of telecommunications and more particularly to fiber optic transmission systems.

BACKGROUND ART

Modern telecommunications has been revolutionized by the extremely high communications bandwidth of fiber optics technology and transmission systems. Vast amounts of information equaling hundreds of thousands of phone calls or hundreds of video channels can be carried on a single beam of modulated laser light. Bandwidth capabilities have been more than doubling every two to three years.

A fiber optic transmission system typically includes an optical transmitter, an optical fiber, an optical amplifier, and an optical receiver.

The optical transmitter receives an electrical digital signal and converts it into an optical signal by modulating a laser light into optical signal pulses that represent the various values or states of the electrical digital signal.

The optical signal pulses are transmitted through the optical fiber and, generally, are amplified by one or more optical amplifiers before being converted back into electrical digital signals by the optical receiver. This is generally referred to as the optical link or optical channel.

The optical signal pulses arriving at the optical receiver must be of sufficient quality to allow the optical receiver to clearly distinguish the on-and-off pulses of light signals sent by the optical transmitter. However, noise, attenuation, and dispersion are a few of the impairments that can distort the optical signal pulses, rendering the optical signal pulses marginal or unusable at the optical receiver and making it difficult or impossible to accurately detect or reconstitute the electrical digital signal. This distortion nonuniformly broadens, spreads, or widens the various optical signal pulses, reducing the spacing between the pulses or causing them to overlap, thereby rendering them virtually indistinguishable.

Conventionally, a properly designed optical channel can maintain a Bit Error Rate ("BER") of $10^{-13}$ or better. When an optical channel degrades to a BER of $10^{-8}$, a telecommunications system may automatically switch to an alternate optical channel in an attempt to improve the BER. Otherwise, the telecommunications system must operate at a reduced or lowered bandwidth, with poorer overall system performance.

Dispersion is a major contributor to distortion of optical signal pulses, leading to increases in the BER. The distortion caused by dispersion generally increases with increases in the bandwidth or data rate, and with increases in the optical fiber transmission distance.

Dispersion has generally been identified as being caused by (1) chromatic dispersion, or (2) polarization mode dispersion ("PMD").

Chromatic dispersion occurs when the various frequency components, or colors, of the optical signal pulse travel at different speeds through the optical fiber and arrive at the optical receiver at different times. This occurs because the index of refraction of a material, such as the optical fiber, varies with frequency or wavelength. As a result, the optical signal pulses are distorted through chromatic frequency-related pulse spreading.

Some of the major solutions for chromatic dispersion have included: (1) single-mode propagation, (2) Distributed Feedback ("DFB") lasers with narrow output spectra, and (3) low attenuation/modified-dispersion optical fibers. All of these advances have contributed to increased bandwidth by allowing the optical signal pulses to pass through the optical fiber with relatively low or reduced dispersion, and hence, relatively low or reduced optical signal distortion.

Single-mode propagation (or use of narrow wavelengths) was achieved through the development of single-mode optical fiber. This optical fiber allows only a single mode of light to propagate through the optical fiber. The DFB laser provides a light source to use with single-mode optical fibers. The DFB laser produces a light with an extremely narrow distribution of output frequencies and wavelengths, minimizing the chromatic dispersion problem. The low attenuation/modified-dispersion optical fiber provides a dispersion-shifted optical fiber that minimizes the speed-vs-wavelength dependency at a specific wavelength.

Previously, chromatic dispersion received greater attention because its adverse effects were initially more limiting at prior, lower available bandwidths and data rates. Now, PMD receives considerable attention due to its potential limitation on optical transparent high-speed long-distance light wave systems, as well as on multi-channel cable television transmission systems.

PMD refers to distortions in the two orthogonal light wave components of the polarized light signal pulses emitted by the optical transmitter. In an ideal optical fiber, which has a perfectly circular cross-section and is free from external stresses, the propagation properties of the two polarized light signal components are identical. However, imperfections introduced in the manufacturing process may result in an optical fiber that is not perfectly circular. In addition, an optical fiber that has been installed may suffer from external stresses such as pinching or bending. These manufacturing imperfections and external stresses cause the two polarization components of the polarized light pulses to have different propagation characteristics, which in turn give rise to PMD.

Despite the manufacturing-induced imperfections, optical fibers (for each optical frequency $\omega$) have two input states ("principal states of polarization", or "PSP's") in which a matching light pulse will undergo no PMD spreading. However, light pulses can be input into a fiber in an arbitrary state, and this leads to the pulses being split into two components that propagate independently through the fiber at different velocities. When these components reach the end of the fiber they recombine as two sub-pulses split in time. The delay between the two sub-pulses is designated as the differential group delay ("DGD"), $\tau$.

The DGD and the PSP's of a long fiber are not only dependent on the wavelength or frequency of the optical pulses, but they also fluctuate in time as a result of environmental variations such as temperature changes, external mechanical constraints, and so forth. Their behavior is random, both as a function of wavelength at a given time and as a function of time at a given wavelength.

Various techniques have been proposed and are known for compensating for PMD in optical transmission systems. Unfortunately, little has been done to harness the power and potential of such PMD compensation technologies to solve problems and afford additional functionalities beyond correction and compensation. In other words, PMD has only been seen as a problem to be corrected or eliminated, and accordingly, opportunities to exploit PMD rather than just compensate for it have not even been considered by those skilled in the art.

Solutions to these problems have been long sought but prior developments have not taught or suggested any solutions and, thus, solutions to these problems have long eluded those skilled in the art.

DISCLOSURE OF THE INVENTION

The present invention provides a method and apparatus for utilizing tunable differential group delay with at least a component of a fiber optic transmission system. A tunable differential group delay system is provided and the tunable differential group delay system is optically connected to a component of the fiber optic transmission system. The tunable differential group delay system is then controlled to insert differential group delay into the component of the fiber optic transmission system. This enables the insertion of DGD into at least a component of a fiber optic transmission system in a manner other than to neutralize or eliminate DGD from the system.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

An important characteristic of optical fibers is that, for any given optical frequency $\omega$, one can always find two orthogonal input principal states of polarization ("PSP's") such that a light pulse, having its input state of polarization ("SOP") matched with the input PSP, undergoes no spreading. However, an input light pulse with an arbitrary SOP can always be decomposed into two sub-polarization components aligned with each of the two axes of the orthogonal PSP's. The two components, propagating independently through the fiber at different group velocities, will recombine at the end of the fiber as a superposition of two sub-pulses split in time. The delay between those two sub-pulses is designated as the differential group delay ("DGD"), $\tau$. A natural measure of polarization mode dispersion ("PMD") is the PMD vector $\vec{\Omega}(\omega)$, that is dependent on the optical frequency $\omega$. The magnitude of the PMD vector $\vec{\Omega}(\omega)$ is equal to the DGD between the two PSP's, $|\vec{\Omega}(\omega)|=\tau$, while its direction determines the direction of the two orthogonal PSP's, $\pm\vec{\Omega}(\omega)/|\vec{\Omega}(\omega)|$.

However, the DGD and PSP's of a long fiber are dependent on wavelength and fluctuate in time as a result of environmental variations such as temperature variations, external mechanical constraints, etc. Their behavior is random, both as a function of wavelength at a given time and as a function of time at a given wavelength. Fortunately, this behavior can be characterized statistically. It can be demonstrated that the probability density function ("PDF") of the randomly changing DGD values in a real fiber follows a Maxwellian Density Distribution. By definition, PMD is its rms value; that is: PMD=$\sqrt{<DGD^2>}$. It is essential to keep in mind that DGD fluctuates in time and can be either smaller or larger than its rms value or PMD.

Figure 1:
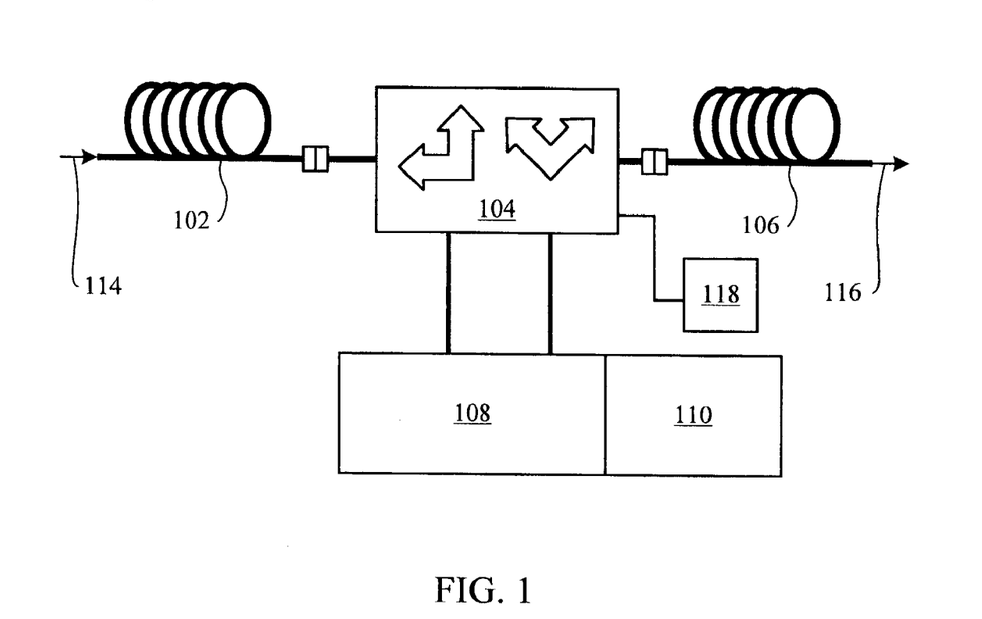
FIG. 1 is a schematic of a system for providing tunable differential group delay in accordance with the present invention.

Referring now to FIG. 1, therein is shown, in schematic form, a system 100 for providing tunable differential group delay according to the present invention. The system 100 includes a first optical fiber segment 102, a polarization controller 104, and a second optical fiber segment 106. The polarization controller 104 is a programmable 2-axis polarization controller. The first optical fiber segment 102 and the second optical fiber segment 106 are polarization maintaining ("PM") fiber segments with fixed DGD values of $\tau_1$ and $\tau_2$, respectively.

The first optical fiber segment 102, the polarization controller 104, and the second optical fiber segment 106 are spliced together in this order, as shown, with the polarization controller 104 being between the first optical fiber segment 102 and the second optical fiber segment 106.

The fixed DGD values $\tau_1$ and $\tau_2$ of the two PM fiber segments can be preset at different values depending on the range of the total DGD to be provided, as discussed further below. Suitable high birefringent PM optical fibers are available, for example, from Corning (PureMode™ 15-U40), Fujikura (SM.15-P-8/125-UV/UV-400), and Fibercore (HB1500T).

For the polarization controller 104, suitable programmable polarization controllers are available, for example, from Corning, General Photonics, Optellios, and others. The phase angle of the wave-plate of such polarization controllers can be controlled in known fashion by a conventional digital-to-analog ("D/A") converter, such as a D/A converter 108 under the control of a CPU 110, connected as shown in FIG. 1.

The optical link to the first optical fiber segment 102 opposite the polarization controller 104 then serves as an input 114 for the system 100, and the end of the second optical fiber segment 106 opposite the polarization controller 104 then serves as an output 116 for the system 100.

Power supplies are provided as appropriate, such as a DC power supply 118 for the polarization controller 104.

To understand the invention from a theoretical standpoint, let $\tau_1$ and $\tau_2$ be the DGD values of the first optical fiber segment 102 and the second optical fiber segment 106, respectively. Let $\Omega_1$ and $\Omega_2$ be the input PMD vectors for the first optical fiber segment 102 and the second optical fiber segment 106, respectively. Let M be the 3×3 Muller Transitional Matrix for the combination of the first optical fiber segment 102 and the polarization controller 104. When the polarization vector at the end of the second optical fiber segment 106 that is connected to the polarization controller 104 is transformed to the input 114 at the first optical fiber segment 102, the Muller Matrix has to be converted. Let $\Omega_{total}$ be the total PMD vector of the system.

This produces the following equation:

$$\Omega_{total}=\Omega_1+M^{-1}\Omega_2 \qquad (1)$$

For the special case when the mode coupling is very weak, such as a PM fiber, its PMD vector can be expressed as:

$$\Omega_1 = \begin{pmatrix} \tau_1 \\ 0 \\ 0 \end{pmatrix}$$

for PM fiber No. 1, and $$\Omega_2 = \begin{pmatrix} \tau_2 \cos\alpha \\ \tau_2 \sin\alpha \\ 0 \end{pmatrix} \quad (2)$$

for PM fiber No. 2, where α is the phase angle between the PSP's of the PM fibers No. 1 and No. 2.

The polarization controllers are usually built of several lambda-quarter and/or lambda-half wave-plates. For a lambda-quarter wave-plate, the inverted Muller Matrix $M^{-1}$ can be described as:

$$M^{-1} = \begin{bmatrix} 1 & 0 & 0 \\ 0 & \cos\theta & \sin\theta \\ 0 & -\sin\theta & \cos\theta \end{bmatrix}^{-1} * \begin{bmatrix} \cos(2\phi') & \sin(2\phi') & 0 \\ 0 & 0 & 1 \\ \sin(2\phi') & -\cos(2\phi') & 0 \end{bmatrix}^{-1} \quad (3)$$

For a lambda-half wave-plate, the inverted Muller Matrix $M^{-1}$ can be described as:

$$M^{-1} = \begin{bmatrix} 1 & 0 & 0 \\ 0 & \cos\theta & \sin\theta \\ 0 & -\sin\theta & \cos\theta \end{bmatrix}^{-1} * \begin{bmatrix} \cos(2\phi') & \sin(2\phi') & 0 \\ \sin(2\phi') & -\cos(2\phi') & 0 \\ 0 & 0 & 1 \end{bmatrix}^{-1} \quad (4)$$

where $\theta = 2\pi c/\lambda \tau_1$ is the total phase shift of the first optical fiber segment 102, and $\phi' \in \{0, \pi\}$ is the rotational angle of the wave-plate.

This produces:

$$\Omega_{total} = \begin{pmatrix} \tau_1 \\ 0 \\ 0 \end{pmatrix} + M^{-1} * \begin{pmatrix} \tau_2 \cos\alpha \\ \tau_2 \sin\alpha \\ 0 \end{pmatrix} \quad (5)$$

In both cases, this produces:

$$\Omega_{total} = \begin{pmatrix} \tau_2 \cos\alpha * \cos2\phi' + \tau_2 \sin\alpha * \sin2\phi' + \tau_1 \\ \tau_2 \cos\alpha * \cos\theta * \sin2\phi' - \tau_2 \sin\alpha * \cos\theta * \cos2\phi' \\ \tau_2 \sin\alpha * \sin\theta * \cos2\phi' - \tau_2 \cos\alpha * \sin\theta * \sin2\phi' \end{pmatrix} \quad (6)$$

The total DGD is derived from the total dispersion vector:

$$|\tau_{output}|^2 = |\Omega_{total}|^2 \quad (7)$$

-continued $$= \tau_1^2 + \tau_2^2 + 2\cos(2\phi' + \alpha) * \tau_1 * \tau_2$$

$$= \tau_1^2 + \tau_2^2 + 2\tau_1 * \tau_2 \cos\phi$$

where $\phi = 2\phi' + \alpha$.

This produces:

$$\tau = \sqrt{\tau_1^2 + \tau_2^2 + 2*\cos\phi * \tau_1 * \tau_2}, \quad (8)$$

This produces:

$$|\tau_1 - \tau_2| \leq \tau_{total} \leq \tau_1 + \tau_2 \quad (9)$$

Theory predicts that the total output DGD value can be controlled from $|\tau_1 - \tau_2|$ to $\tau_1 + \tau_2$, depending on the coupling ratio cos φ.

Figure 2:
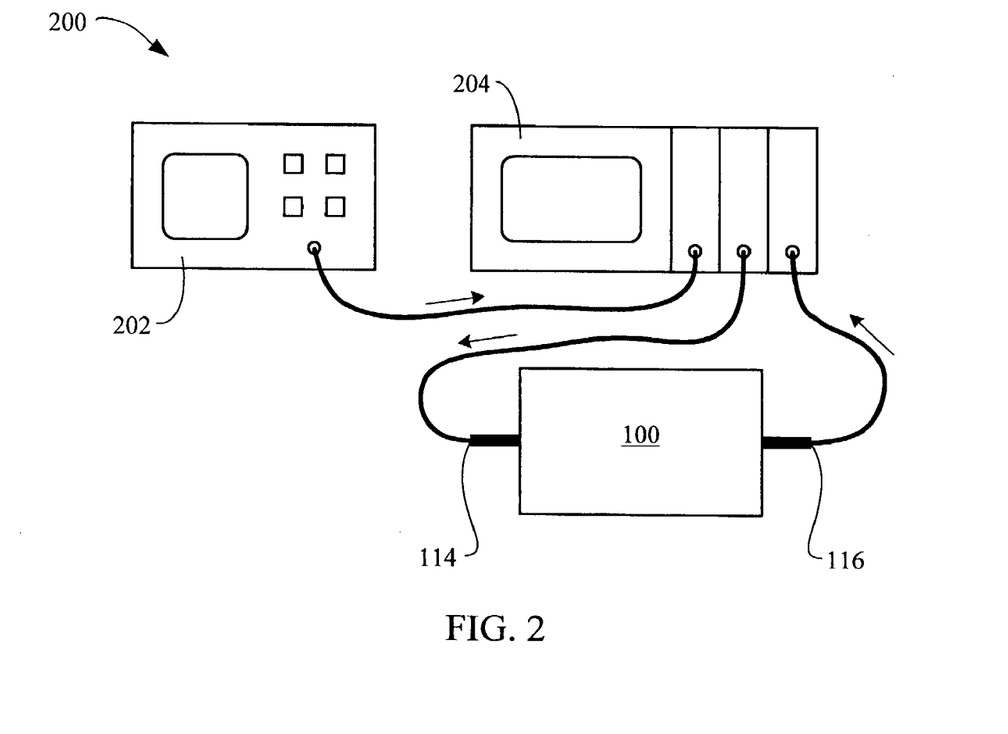
FIG. 2 is a schematic of a configuration for measuring and calibrating the system of FIG. 1 in accordance with the present invention.

Referring now to FIG. 2, therein is shown a schematic 200 for measuring and calibrating the system 100. As illustrated, a tunable laser 202 provides test optical signals to a PMD analyzer 204, which in turn is connected to the system 100 of the present invention. A suitable tunable laser is available from Agilent (model 8163 A), and a suitable PMD analyzer is available from Profile (Pat 9000 B with a 9300 Polarizer).

The test optical signals are generated by the tunable laser 202 as described above, initially measured for later comparison by the PMD analyzer 204, passed through the system 100 (i.e., through the first optical fiber segment 102, the polarization controller 104, and the second optical fiber segment 106) by means of the input 114 and the output 116 thereof. The resultant signals are returned to the PMD analyzer 204 to compare the signal with that originally generated by the tunable laser 202 for determining the resultant DGD values generated by the system 100.

In a first test, two PM fiber segments with DGD values of 10.32 ps and 4.95 ps were chosen for the first optical fiber segment 102 and the second optical fiber segment 106, respectively. The DGD was controlled by varying cosφ by tuning the wave-plates of the polarization controller 104. According to equation (9), the total output DGD value should be in the range of 5.37 ps to 15.27 ps. The experimental results (which had a fluctuation of less than ±0.2 ps with very good repeatability) yielded measured total DGD values from 5.87±0.06 ps to 15.48±0.01 ps, effectively matching the theory. (The very slight difference between theoretical expectations and the measured data is believed to be due to the residual DGD from the fiber pigtails of the polarization controller 104 and the splices that connect the optical fiber segments and the polarization controller.)

In a second test, two PM fiber segments with DGD values of 10.32 ps and 14.96 ps were chosen for the first optical fiber segment 102 and the second optical fiber segment 106, respectively. According to equation (9), the total output DGD value should be in the range of 4.64 ps to 25.28 ps. The experimental results (which had a fluctuation of less than ±0.5 ps) yielded measured total DGD values from 5.07 ps to 25.02 ps, also effectively matching the theory.

The power and utility of the system 100 can be particularly appreciated when considering prior solutions for actively correcting for DGD. One such solution, for example, uses mechanical delay lines. Unfortunately, this only allows for continuous delay up to a specified limit, and it requires a mechanical translation device. The speed, cost, and mechanical reliability are thus undesirable.

Another prior solution involves using fibers with high polarization dispersion, also referred to as polarization-maintaining fibers (PMF). They can be used in short lengths to procure a fixed differential delay with invariant principal states of polarization. Polarization dispersion can then be compensated optically by judiciously placing a component of this kind (or any system for generating a differential delay between two orthogonal polarization modes) in series with a transmission link subject to polarization dispersion. This can be achieved either by using a polarization maintaining fiber with the same differential delay as the link, but interchanging the slow and fast principal states of polarization, or by making a principal state of polarization of the combination of the link and the polarization maintaining fiber coincide with the state of polarization of the source of the transmission. However, such a fixed configuration is limited by its ability to compensate for only one value of DGD when, in fact, birefringence is randomly varying. That is, since PMD is statistical in nature, the amount of induced DGD varies with time. If the value of the DGD differs from the fixed delay in the PMD at any particular time, the PMD compensation will then only partially compensate for the adverse effects of DGD.

In current optical communication systems, PMD changes are sometimes compensated by a Polarization Mode Dispersion Compensator ("PMDC") that detects the degree of polarization-dependent differential delay suffered by an optical carrier and then adaptively corrects the delay. As polarization characteristics of the fiber change, the PMDC constantly monitors and adjusts the signal in an attempt to minimize the PMD contribution to overall dispersion. Such a PMD compensator will physically split an incoming optical signal into two orthogonal polarization components using a polarization beam splitter. The relative timing of the two signal halves is then corrected by introducing a relative delay into one signal half and recombining the halves with a polarization beam combiner to form a corrected output signal. Such a procedure has low speed (sub-second), large output polarization fluctuations, a large footprint, and poor stability due to mechanical motion.

Prior schemes to actively compensate for PMD thus generally involve detecting the presence of polarization-dependent timing differences and either a) applying delay elements to one or the other polarization to realign the timing of pulses, or b) controlling the SOP of the signal upon entry into the fiber, or at intermediate points along the fiber, such that birefringent effects are minimized or canceled out. Existing PMD compensators therefore either include an SOP detector and/or controller in order to feed a consistent polarization orientation into the beam splitter at the front end of the compensator, or rely on the use of one elsewhere in the optical communication system.

However, PMD in long single-mode fibers has a stochastic characteristic, because of random-mode coupling induced by length dependent random birefringence, and requires responsive, dynamic compensators. Such tunable DGD in PMD compensation, as taught herein, can reduce the risk of feedback loops trapping in a locally optimized state, and provides superior performance as compared to fixed ones. In addition, for PMD compensators using polarization scrambling at the transmitter to reduce the complexity and increase the stability of the feedback control, a tunable DGD must be applied dependably to exactly cancel the fiber's first-order DGD.

As higher-order PMD effects become significant for pure first-order compensators to handle, tunable DGD becomes even more important for higher-order PMD compensation. This is particularly so because, due to the randomly changing behavior of the PMD, it is almost impossible to predict the instant DGD value of a network system.

Thus, the tunable differential group delay compensation method and apparatus disclosed herein furnish very important and heretofore unknown solutions and capabilities for high bit rate fiber optical network systems.

It will be appreciated, however, that the major focus of such prior efforts has been to manage and compensate for DGD effects, with a view toward eliminating DGD. In contrast, it has been discovered that it is possible to exploit DGD. The present invention teaches how to use the highly versatile and responsive capabilities of the system 100 to intentionally, advantageously, and controllably insert DGD into a component of a fiber optic transmission system to provide new functionalities and benefits heretofore unknown and unavailable. As used herein, therefore, the term "insert" is intended and is to be understood to refer to the addition of DGD to at least a component of a fiber optic transmission system in a manner other than to neutralize or eliminate DGD from the system.

One such use, as taught herein, is emulation of first-order PMD. Such emulation can be very useful in testing fiber optic transmission systems, and for testing PMD compensators in such systems. The variable DGD module defined by the system 100 disclosed herein affords precise, controllable, and repeatable DGD generation. This is ideal for rapidly, reliably, and accurately generating a series of DGD values with any statistical distribution for a given number of N samples, e.g. Maxwellian, Gaussian, or Lorentzian distributions.

As noted earlier, the probability density function of the randomly changing DGD values in a real fiber optical system is found to follow a Maxwellian Density Distribution in the time domain. Thus, a corresponding algorithm and electronics can control the system 100 variable DGD module and use it to generate statistical DGD samples with a Maxwellian distribution and a selectable average DGD value $<\tau>$. The tunable average DGD value dominates the statistical behavior of the Maxwellian distribution as the following:

$$n_i = (\tau_i^2/\sigma^3)\sqrt{\frac{2}{\pi}}\, e^{-\frac{\tau_i^2}{2\sigma^2}} N,$$

where N is the total number of sampling counts, $$\sigma = <\tau>\sqrt{\frac{\pi}{8}},$$

and $n_i/N$ is the probability of occurrence of a DGD value of $\tau_i$. The result is an output of DGD values that is random in response to conventional random values that are input from conventional control electronics (not shown), while the overall DGD output of the system 100 exhibits the Maxwellian distribution that is characteristic of real-world systems. Accordingly, the present invention affords a powerful, accurate, and high-speed first-order PMD emulator.

Another important application of the variable DGD module defined by the system 100 is bit alignment in time-division-multiplexing ("TDM") systems. In high-speed TDM systems, precisely positioning data in an assigned time slot at the transmission end and selecting a desired time slot at the receiving end are critical. The system 100 can fulfill this need.

Figure 3:
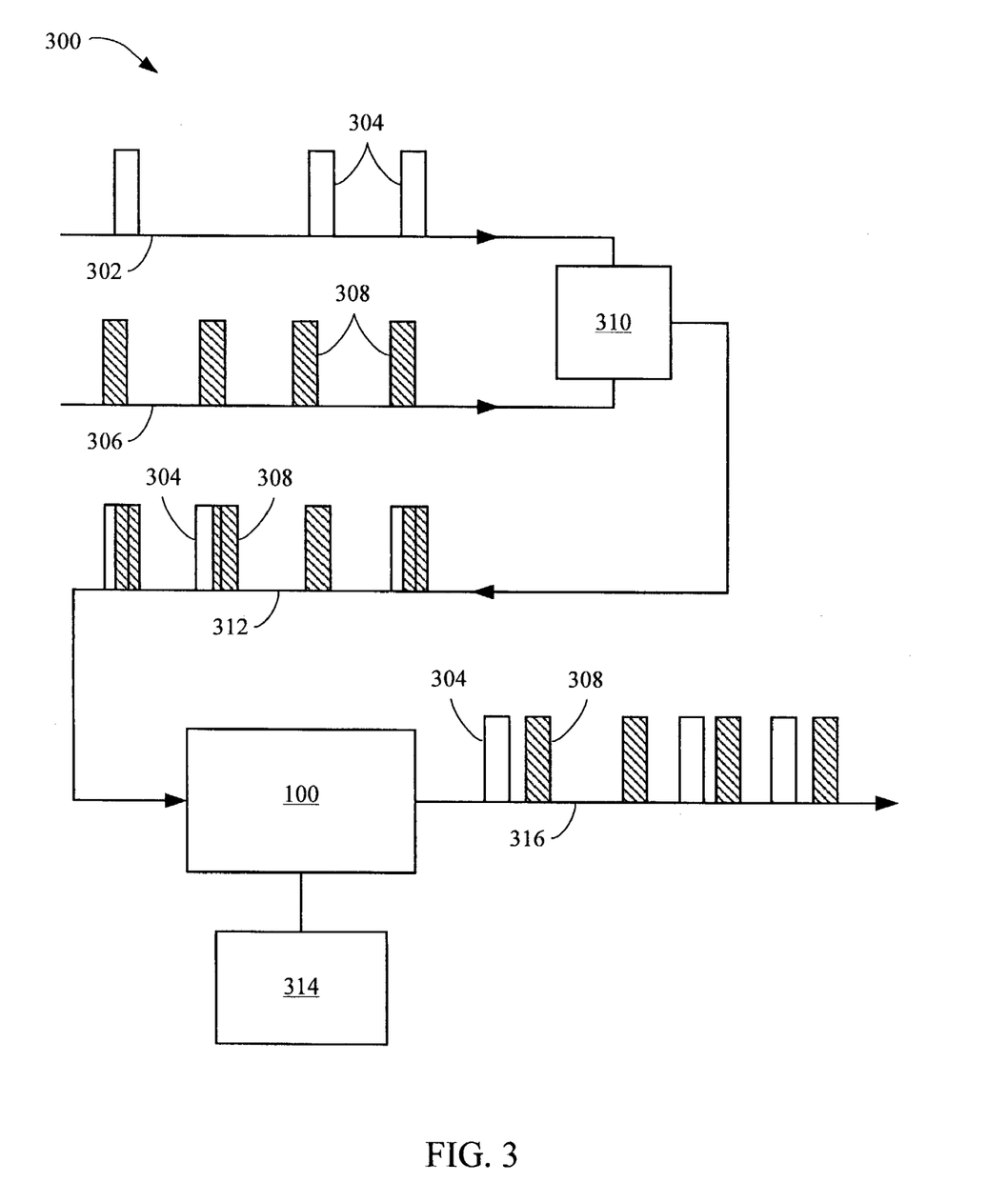
FIG. 3 is a diagrammatic illustration of an application of the system of FIG. 1 for performing bit alignment in a time-division-multiplexing system.

Referring now to FIG. 3, therein is shown a bit-alignment application 300 for a TDM system. A first data stream 302 having data bits 304, and a second data stream 306 having data bits 308, are depicted being combined by a polarization beam combiner 310 into a combined data stream 312. The combined data stream 312 then enters the variable DGD module defined by the system 100. As can be seen, the bits in the initial, uncombined data streams 302 and 306 are not well aligned with one another. In fact, some of the bits overlap in time, as can be seen in the combined data stream 312.

To use the system 100 to correct this time-related misalignment in the data bit streams, an important consideration is that the data bits 304 in the first data stream 302 have to be aligned with one eigen-polarization axis of the device, and the data bits 308 in the second data stream 306 have to be aligned with the other eigen-polarization axis. This axial polarization alignment is performed by the polarization beam combiner 310, which combines the two data streams in known fashion into the combined data stream 312 in which the data streams are aligned with their respective eigen-polarization axes.

Once the two data streams are thus aligned axially, the system 100 is then able to align the data bit streams temporally by differentially delaying one with respect to the other, depending upon their repective alignments with the system 100. As depicted in FIG. 3, for example, the first data stream 302 has been aligned with the system 100 such that the data bits 304 in the first data stream 302 can be controllably delayed. Then, by appropriate adjustment of the polarization controller 104 (FIG. 1) under the control of a suitable control circuit 314, the system 100 delays the data bits 304 to place them in precise time-alignment with the data bits 308. The end result is depicted by the aligned data stream 316, in which the data bits 304 and the data bits 308 are in the desired relative temporal relationship. Thus, the DGD between the two data streams can be controlled and adjusted to align and position the two data bit streams into their precise respective time slots.

Figure 4:
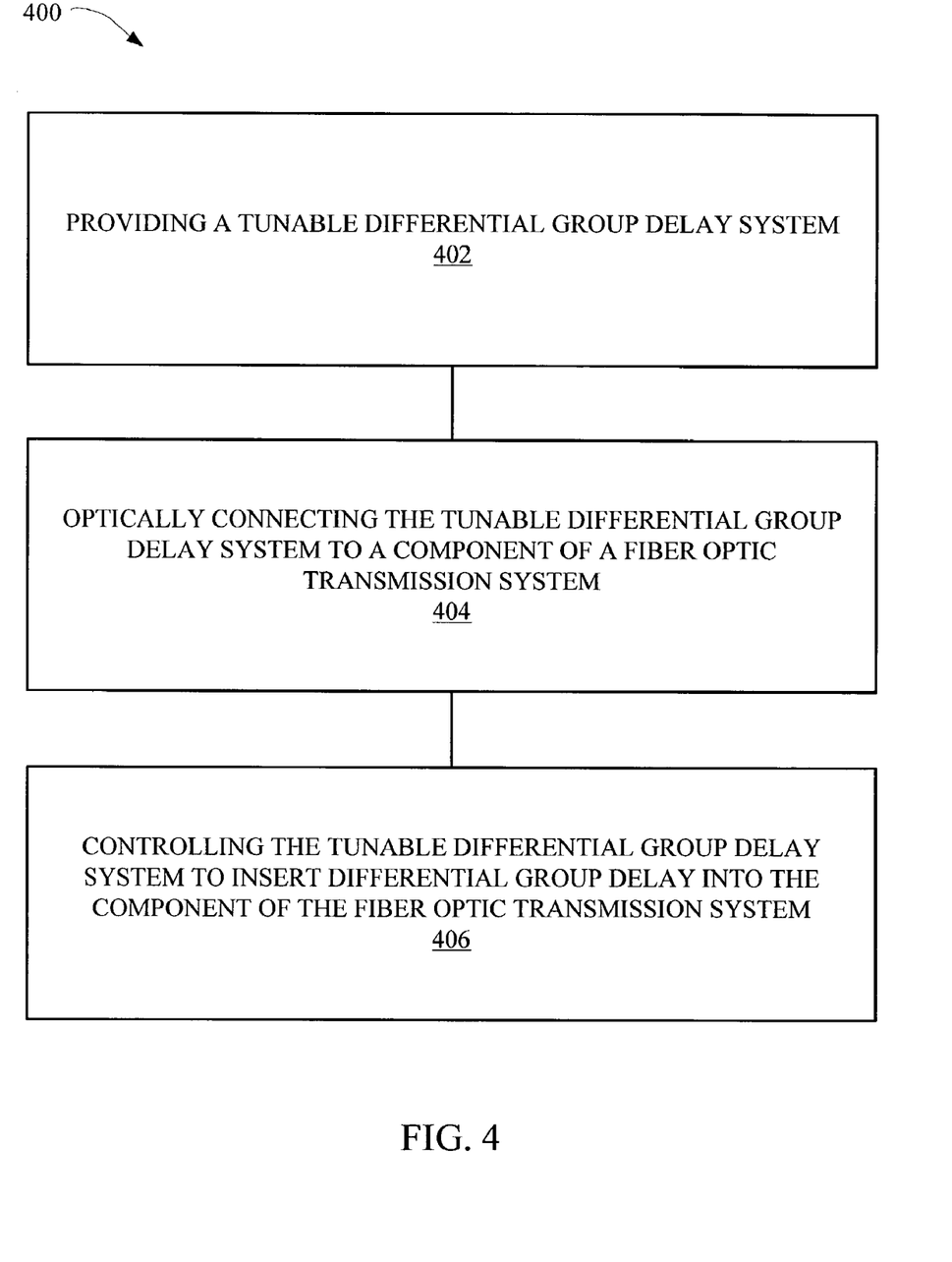
FIG. 4 is a flow chart of a method for utilizing tunable differential group delay with at least a component of a fiber optic transmission system.

Referring now to FIG. 4, therein is shown a flow chart of a method 400 for utilizing tunable differential group delay with at least a component of a fiber optic transmission system in accordance with the present invention. The method 400 includes a step 402 of providing a tunable differential group delay system; a step 404 of optically connecting the tunable differential group delay system to a component of the fiber optic transmission system; and a step 406 of controlling the tunable differential group delay system to insert differential group delay into the component of the fiber optic transmission system.

It has been discovered that the present invention thus furnishes numerous important and heretofore unavailable advantages, and provides significant new and heretofore unknown solutions and capabilities for high bit rate fiber optical network systems.

An advantage is that the present invention provides real-time, dynamic, and controllable DGD compensation.

A principle advantage of the present invention is the insertion of DGD into at least a component of a fiber optic transmission system in a manner other than to neutralize or eliminate DGD from the system.

Another advantage is that the invention enables active emulation of first-order PMD.

Still another advantage is the ability of the present invention to provide controllable bit alignment in TDM systems.

Another advantage is the ability to test the bit error rate of a network.

Yet another advantage of the present invention is that it can test individual components of a network by sweeping the DGD, yielding bit error rate vs. DGD.

Still another advantage is the ability to evaluate the performances of various PMD compensators and other optical network components having PMD.

Another advantage is the use of the present invention to encode or encrypt by artificially distorting or changing the DGD of the signal at transmission, and then reversing at reception to restore the original signal.

A still additional advantage is that the present invention can be used to transmit data by means of DGD modulation. That is, DGD modulation can add additional data to the data stream.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A method for utilizing tunable differential group delay with at least a component of a fiber optic transmission system, comprising:
   providing a tunable differential group delay system;
   optically connecting the tunable differential group delay system to a component of the fiber optic transmission system; and
   controlling the tunable differential group delay system to insert differential group delay into the component of the fiber optic transmissions system wherein controlling the tunable differential group delay system to insert differential group delay into the component of the fiber optic transmission system further comprises providing emulation of first-order polarization mode dispersion, the emulation including generating statistical differential group delay samples having a Maxwellian distribution and a predetermined average differential group delay value.

2. The method claim 1 wherein controlling the tunable differential group delay system to insert differential group delay into the component of the fiber optic transmission system further comprises providing controllable bit alignment in a time-division-multiplexing system.

3. The method of claim 1 wherein controlling the tunable differential group delay system to insert differential group delay into the component of the fiber optic transmission system further comprises providing controllable bit alignment in a time-division-multiplexing system, the providing controllable bit alignment including aligning the data bits in a first data stream with one eigen-polarization axis and aligning the data bits in a second data stream with the other eigen-polarization axis prior to insertion of the differential group delay.

4. A method for utilizing tunable differential group delay with at least a component of a fiber optic transmission system, comprising:
   providing a first optical fiber segment of fixed high birefringent optical fiber;
   providing a polarization controller optically connected to the first optical fiber segment;

providing a second optical fiber segment of fixed high birefringent optical fiber optically connected to the polarization controller opposite the first optical fiber segment;

selecting the first and second optical fiber segments with predetermined fixed values of $\tau_1$ and $\tau_2$, respectively, to provide a total output differential group delay value between $|\tau_1-\tau_2|$ and $\tau_1+\tau_2$;

optically connecting a component of the fiber optic transmission system to the second optical fiber segment opposite the polarization controller; and controlling the polarization controller to insert differential group delay into the component of the fiber optic transmission system wherein controlling the polarization controller to insert differential group delay into the component of the fiber optic transmission system further comprises providing emulation of first-order polarization mode dispersion wherein providing emulation of first-order polarization mode dispersion further comprises generating statistical differential group delay samples having a Maxwellian distribution and a predetermined average differential group delay value.

5. The method of claim 4 wherein controlling the polarization controller to insert differential group delay into the component of the fiber optic transmission system further comprises providing controllable bit alignment in a time-division-multiplexing system.

6. The method of claim 5 wherein providing controllable bit alignment in a time-division-multiplexing system further comprises aligning the data bits in a first data stream with one eigen-polarization axis and aligning the data bits in a second data stream with the other eigen-polarization axis prior to insertion of the differential group delay.

7. A system for utilizing tunable differential group delay with at least a component of a fiber optic transmission system, comprising:

a tunable differential group delay system optically connected to a component of the fiber optic transmission system; and circuitry for controlling the tunable differential group delay system to insert differential group delay into the component of the fiber optic transmission system wherein the circuitry for controlling the tunable differential group delay system to insert differential group delay into the component of the fiber optic transmission system includes circuitry for providing emulation of first-order polarization mode dispersion wherein the circuitry for providing emulation of first-order polarization mode dispersion further comprises circuitry for generating statistical differential group delay samples having a Maxwellian distribution and a predetermined average differential group delay value.

8. The system of claim 7 wherein the circuitry for controlling the tunable differential group delay system to insert differential group delay into the component of the fiber optic transmission system further comprises circuitry for providing controllable bit alignment in a time-division-multiplexing system.

9. The system of claim 8 wherein the circuitry for providing controllable bit alignment in a time-division-multiplexing system further comprises circuitry for aligning the data bits in a first data stream with one eigen-polarization axis and aligning the data bits in a second data stream with the other eigen-polarization axis prior to insertion of the differential group delay.

10. A system for utilizing tunable differential group delay with at least a component of a fiber optic transmission system, comprising:

a first optical fiber segment of fixed high birefringent optical fiber;

a polarization controller optically connected to the first optical fiber segment;

a second optical fiber segment of fixed high birefringent optical fiber optically connected to the polarization controller opposite the first optical fiber segment;

the first and second optical fiber segments having predetermined fixed values of $\tau_1$ and $\tau_2$, respectively, to provide a total output differential group delay value between $|\tau_1-\tau_2|$ and $\tau_1+\tau_2$;

a component of the fiber optic transmission system being optically connected to the second optical fiber segment opposite the polarization controller; and circuitry for controlling the polarization controller to insert differential group delay into the component of the fiber optic transmission system wherein the circuitry for controlling the polarization controller to insert differential group delay into the component of the fiber optic transmission system further comprises circuitry for providing emulation of first-order polarization mode dispersion wherein the circuitry for providing emulation of first-order polarization mode dispersion further comprises circuitry for generating statistical differential group delay samples having a Maxwellian distribution and a predetermined average differential group delay value.

11. The system of claim 10 wherein the circuitry for controlling the polarization controller to insert differential group delay into the component of the fiber optic transmission system further comprises circuitry for providing controllable bit alignment in a time-division-multiplexing system.

12. The system of claim 11 wherein the circuitry for providing controllable bit alignment in a time-division-multiplexing system further comprises circuitry for aligning the data bits in a first data stream with one eigen-polarization axis and aligning the data bits in a second data stream with the other eigen-polarization axis prior to insertion of the differential group delay.

* * * * *

UNITED STATES PATENT AND TRADEMARK OFFICE
CERTIFICATE OF CORRECTION

PATENT NO. : 7,366,414 B2  
APPLICATION NO. : 10/423148  
DATED : April 29, 2008  
INVENTOR(S) : Zeng et al.

Page 1 of 1

It is certified that error appears in the above-identified patent and that said Letters Patent is hereby corrected as shown below:

Column 6
    line 20, delete "a" and insert therefor --á--

Column 10
    claim 1, line 36, delete "transmissions" and insert therefor --transmission--

Column 10
    claim 2, line 45, insert --of--

Signed and Sealed this

Nineteenth Day of August, 2008

JON W. DUDAS  
*Director of the United States Patent and Trademark Office*